Dec. 30, 1958

M. C. SYERS, SR 2,866,504

COTTON SAMPLE CUTTER

Filed July 13, 1956

Manuel C. Syers, Sr.
INVENTOR.

BY *[signatures]*
Attorneys

Dec. 30, 1958   M. C. SYERS, SR   2,866,504
COTTON SAMPLE CUTTER
Filed July 13, 1956   3 Sheets-Sheet 2

Manuel C. Syers, Sr
INVENTOR.

Dec. 30, 1958
M. C. SYERS, SR
2,866,504
COTTON SAMPLE CUTTER
Filed July 13, 1956
3 Sheets—Sheet 3
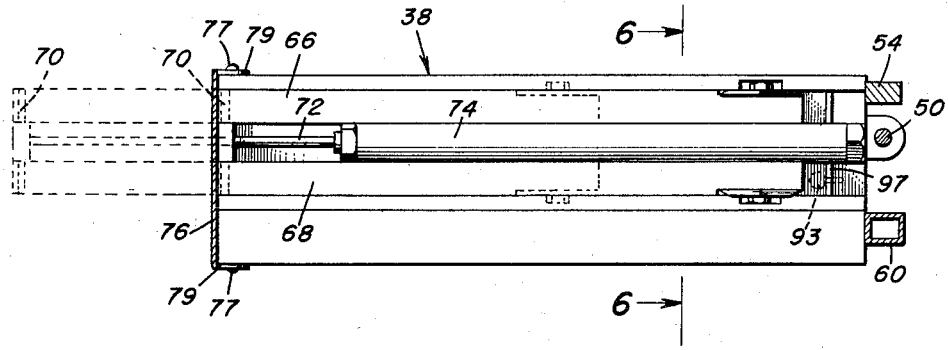
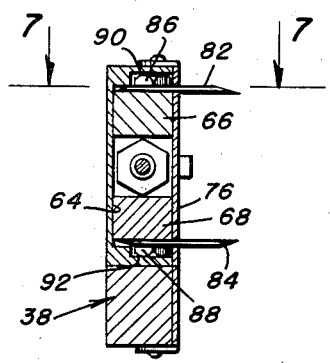
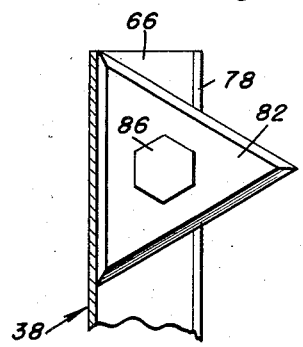
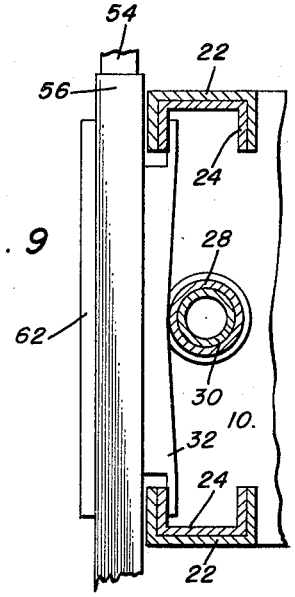
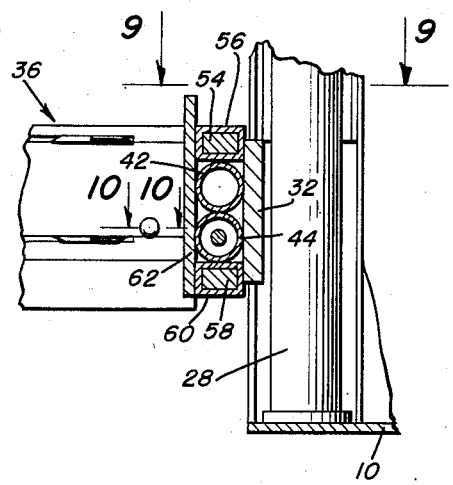
Manuel C. Syers, Sr.
INVENTOR.
BY *[signatures]*
Attorneys

United States Patent Office 2,866,504
Patented Dec. 30, 1958

2,866,504

COTTON SAMPLE CUTTER

Manuel C. Syers, Sr., Galveston, Tex.

Application July 13, 1956, Serial No. 597,804

13 Claims. (Cl. 164—75)

This invention comprises a novel and useful cotton sample cutter and more particularly relates to an apparatus for efficiently cutting uniform samples from opposite sides of bales of cotton at selected positions thereon.

When lint cotton and other fibers have been stored and compressed in bales, it is frequently desirable to remove samples of the baled fibers in order to conduct tests thereon, to grade the baled fibers and the like. Heretofore, such sampling has commonly been effected by manually cutting the bale and removing a group of the fibers severed therefrom. This work is considerably laborious, and frequently necessitates the moving of bales in order to effect the obtaining of samples from opposite sides of the bale and from selected portions thereof.

It is the primary purpose of this invention to provide an apparatus for effectively cutting samples from opposite sides of and at any selected height of a bale.

A further object of the invention is to provide an apparatus in conformity with the foregoing object which will be capable of easily manipulating a bale in order to cut samples therefrom.

A further object of the invention is to provide an apparatus as set forth in the above mentioned objects which shall be extremely portable in its nature, shall reduce fatigue of the person obtaining samples of bales by the use of power mechanism for handling the bale, traveling to and from the bale and for cutting samples thereof.

A still further important object of the invention is to provide a portable machine as set forth in the above mentioned objects, wherein the power operated mechanism for handling a bale and obtaining samples therefrom, shall be of a simple construction, dependable in operation and readily accessible for servicing and repairs.

And a final important object of the invention to be specifically enumerated herein, resides in the provision of an apparatus in accordance with the objects above set forth, wherein a pair of parallel cutting arms in vertically spaced relation upon each of a pair of bale embracing arms of the apparatus shall be power actuated to effect a clean and precise sampling cut in a selected elevation in a bale; and whereby the cutting knives may be readily adjustably positioned for presenting fresh cutting surfaces and enhancing the operation of the knife portion of the mechanism.

These together with other objects and advantages which will become subsequently apparent reside in the details of construction and operation as more fully hereinafter described and claimed, references being had to the accompanying drawings forming a part hereof, wherein like numerals refer to like parts throughout, and in which:

Figure 5 is a detail view taken upon an enlarged scale substantially upon the plane indicated by section line 5—5 of Figure 4 and illustrating in side elevation the arrangement of one of the arms, alternative positions being shown in dotted lines;

Figure 6 is a detail view in vertical section taken substantially upon the plane indicated by section line 6—6 of Figure 5 and showing the internal construction of one of the arms;

Figure 7 is a horizontal sectional view taken substantially upon the plane indicated by section line 7—7 of Figure 6 and showing the construction and positioning of one of the cutter blades of an arm;

Figure 8 is a detailed view in vertical section through a portion of the chassis and support standard of the apparatus showing the arm supporting carriage thereon;

Figure 10:
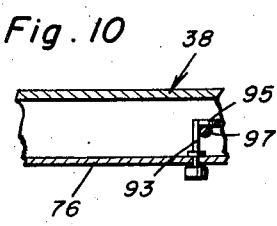

Figure 9 is a horizontal sectional view taken upon an enlarged scale substantially upon the plane indicated by the section line 9—9 of Figure 8 and showing the guide construction by which the carriage is mounted for vertical movement; and Figure 10 is a detail view taken upon an enlarged scale substantially upon the plane indicated by the section line 10—10 of Figure 8 and showing a locking means forming a part of the invention.

Figure 1:
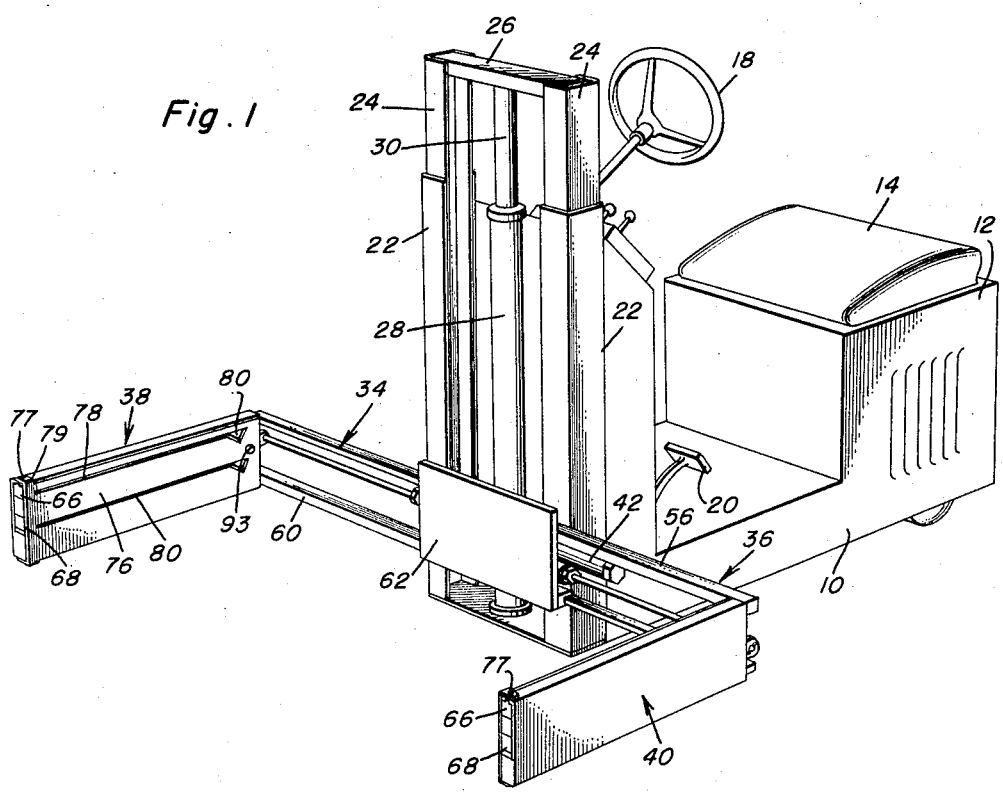
Figure 1 is a perspective view of one suitable embodiment of apparatus in accordance with the principles of this invention, is taken from the front end thereof.
Figure 2:
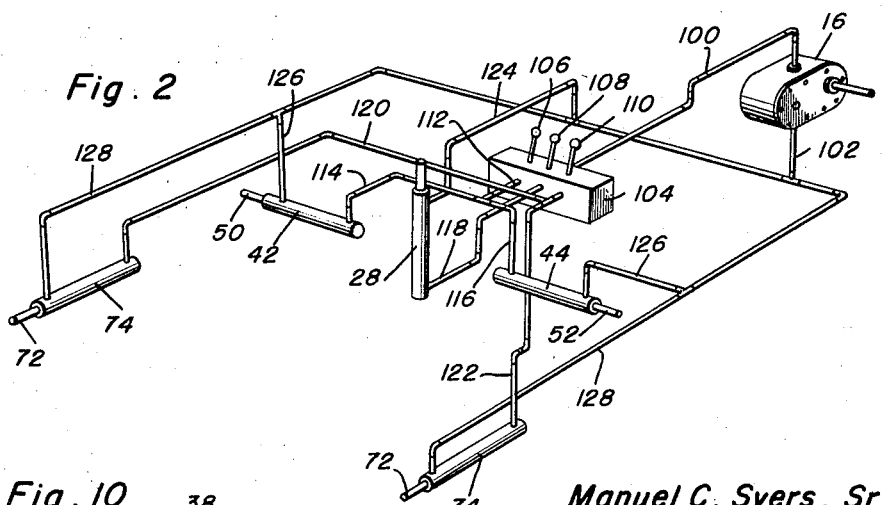
Figure 2 is a diagrammatic view of the hydraulic power operating system for actuating the various elements of this apparatus.

Referring first primarily to Figure 1 it will be seen that the apparatus in accordance with this invention consists of a mobile chassis or base 10 having a compartment 12 providing a seat 14 for the driver and housing a power plant, not shown, but which may supply power for rendering the apparatus mobile, and may operate a hydraulic pump 16, shown diagrammatically in Figure 2, whereby the various mechanisms of the apparatus may be energized.

The wheel chassis may be steered as by a steering mechanism including a steering wheel 18, and the application of power thereto may be controlled as by the customary control such as a foot pedal 20.

Rising from the forward portion of the wheeled platform, base or chassis 10 is a support comprising a pair of channel iron members 22, which have their channels facing each other as will be apparent from Figure 9. These channel iron members constitute a lower or stationary section of a telescoping support whose upper section consists of a pair of complementary channel iron members 24 slidably received in the members 22, and having a cross member or head 26 rigidly secured between the upper end of the same.

In order to vertically adjust the movable and stationary telescoping sections of the support, there is provided a hydraulic cylinder member 28 which is suitably secured to the base between the support channels 22 and which has a piston rod 30, provided with a piston, not shown, and slidable therein and secured to the cross member 26 at the central portion of the same, Figure 1.

Figure 4:
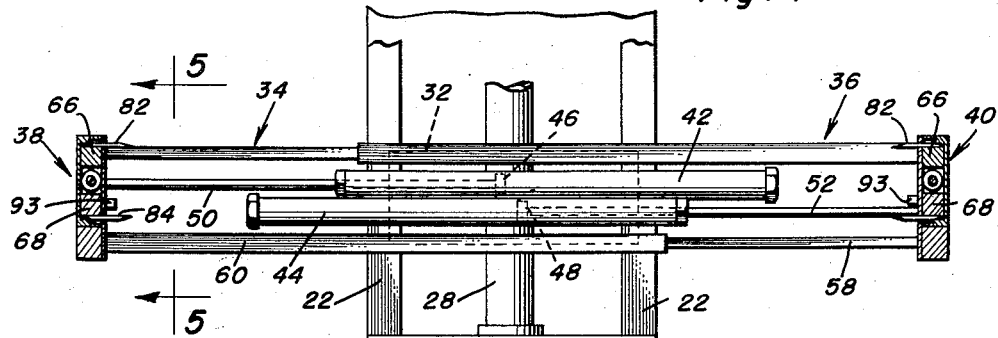
Figure 4 is a vertical transverse sectional view taken substantially upon the plane indicated by section line 4—4 of Figure 3 and showing the arm constructions and the members for supporting and actuating the arms.

Fixedly secured in any desired manner to the channel iron members 24 of the movable section of the support is a carriage assembly, including a transversely extending plate 32, see Figures 4, 8 and 9, and which supports in slidable relation laterally extending members 34 and 36.

As will be best apparent from Figure 1, a pair of horizontally extending parallel arms 38 and 40 are rigidly secured to and carried by the laterally extending members 34 and 36.

Referring now especially to Figures 1, 2, 4 and 8, it will be observed that the carriage body has disposed in a chamber therein a pair of hydraulic cylinder units 42 and 44 provided with pistons 46 and 48 respectively, together with piston rods 50 and 52 which are operatively connected to the arms 38 and 40. The members 34 and 36 are further provided with complementary guide members which cooperate with each other and with the carriage for guiding the members in their horizontal sliding movement. Thus, see also Figure 5, the member 34 has an upper solid guide bar 54 which is slidably received in the complementary hollow upper guide bar 56 of the member 36; while the lower solid guide bar 58 of the member 36 is slidably and guidingly received in the complementary hollow guide bar 60 of the member 34. In addition, the hollow guide members 56 and 60 in turn are securely mounted between the mounting plate 32 and a front plate 62 of the carriage which is secured to plate 32. It will thus be apparent that when fluid is supplied under pressure in the manner to be subsequently set forth to the cylinders 42 and 44, laterally projecting members 34 and 36 and the arms 38 and 40 rigidly carried by the guide bars 54, 56 and 58, 60 will be moved horizontally towards and from each other for a purpose which will be subsequently apparent.

Figure 3:
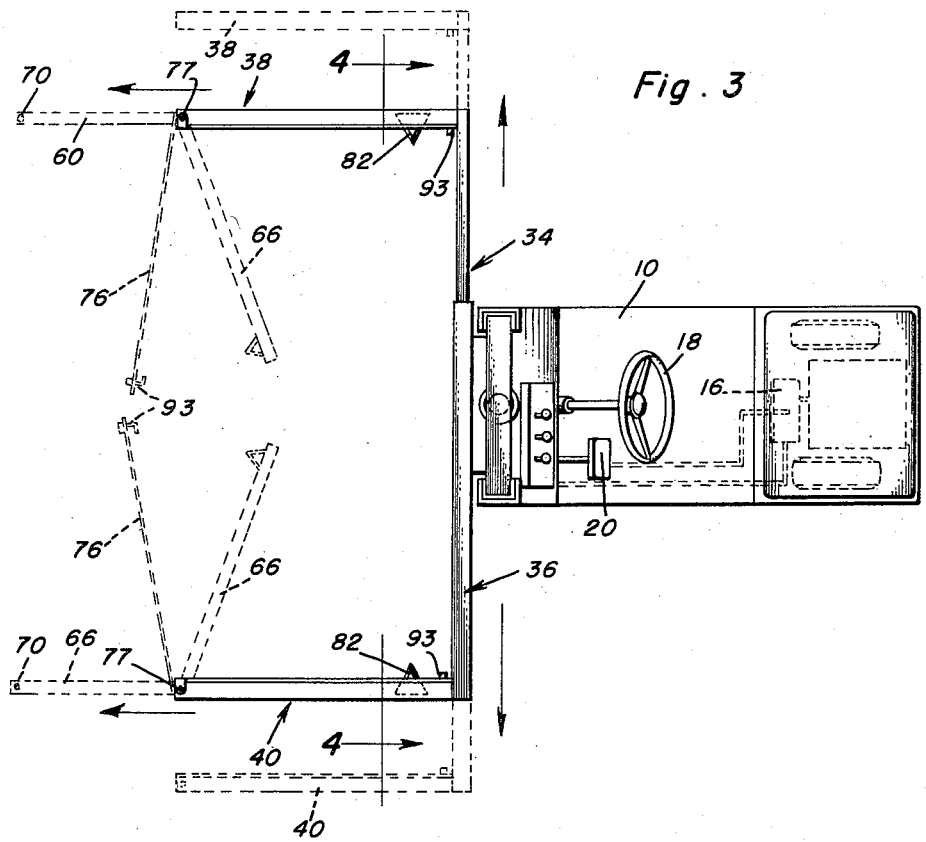
Figure 3 is a top plan view of the apparatus of Figure 1, alternative positions of the parts and concealed portions being shown in dotted lines therein.

The two arms 38 and 40 are of identical construction, and accordingly a description of the arm 38 will suffice for an understanding of the construction and operation of both of the arms. Referring now particularly to Figures 3, 5 and 6, it will be seen that the arms are each provided with a longitudinally extending channel or chamber 64 opening from the inside surface of the arm. A slide is received in this chamber, and consists of upper and lower bars 66 and 68 which are connected at their outer ends as by a vertical piston pin 70 to the outer end of a piston rod 72 carrying a piston, not shown, which is slidably received in a centrally disposed hydraulic cylinder 74, the cylinder having its inner end suitably secured in the arm. As will be apparent by comparing the full and dotted line showing in Figure 3, each of the slide assemblies, comprising the slide bars 66 and 68 may be pivoted or swung horizontally about their pivot pin 70, into and out of the chamber 64. A closure plate 76 is terminally pivoted at 77 by means of ears 79 to each arm for closing the chamber and confining the slide members to longitudinal sliding movement therein.

As will be best apparent from Figures 1 and 6, each closure plate 76 is provided with upper and lower, parallel longitudinally extending slots 78 and 80. The outer end of each arm is open so that the slides 66, 68 and pin 70 can move outwardly thereof under the actuation of the piston rod and cylinder 72 and 74, as shown in dotted lines in Figures 3 and 5.

Referring now particularly to Figures 5, 6 and 7, it will be seen that a pair of triangular cutter blades 82 and 84 are secured to the top and bottom sides of the slide bars 66 and 68 as by fastening bolts 86 and 88 respectively. When so arranged, as will be apparent from Figures 6 and 7, a point of each blade will extend through the slots 78 or 80 when the covers 76 are closed, for travel longitudinally thereof with movement of the slides. The chamber 64 in the body of each arm is provided with longitudinally extending upper and lower channels or recesses 90 and 92 to provide clearance for the fasteners 86 and 88.

When wear develops and it is necessary to replace a worn plate the covers 76 may be opened as in Figure 3 and the slides 66, 68 then swing outwardly about the pivot pin 70. Thereupon the fasteners 86, 88 may be removed and the blades 82, 84 then replaced or turned to present a fresh edge.

In order to releasably latch the covers 76 in closed position, there is provided a conventional form of latch rod 93 carried by each cover and having a latch finger 95 which upon rotation of the rod 93 may be selectively engaged with or released from a latch keeper pin 97 disposed in the arm 38 or 40.

Referring now to the diagrammatic view of Figure 2, in conjunction with Figure 3, it will be seen that the hydraulic pump 16, powered by the power plant of the apparatus, is provided with a fluid pressure delivery line 100 and a return line 102.

The fluid supply from the pump 16 passes by the delivery conduit 100 to a control valve 104 of any suitable character, and which is preferably provided with three control levers 106, 108 and 110. The control lever 106 controls supply of fluid by the conduit 112 and branch conduits 114 and 116 to the cylinders 42 and 44 which thus simultaneously operate the lateral extension members which carry the two arms and thus move the arms toward or from each other in a horizontal plane, as will be apparent from Figures 1 and 3, as particularly from the full line and dotted line showings of Figure 3. By this means the arms are caused to move towards or from each other to thereby grip a bale of fibers whereby the bale may be manipulated and positioned; but more important, whereby the bale may be firmly gripped to permit the cutters to sever samples therefrom.

The control lever 108 controls the supply of pressure fluid by a conduit 118 to the cylinder 28, which thus raises or lowers the telescoping sections of the support to thereby vertically adjust the carriage and the lateral supporting members and arms carried thereby, whereby the arms may be positioned in vertically adjusted position upon the opposite sides of a bale.

The control lever 110 controls the supply of fluid by the conduits 120 and 122 to the hydraulic cylinders 74 in the arms 38 and 40 to thereby operate the slides and cause a horizontal traversing of the upper and lower cutter knives of each arm, to thus sever samples of uniform depth, length and thickness from opposite sides of the bale.

Return conduits 124, 126 and 128 serve to effect reverse flow of fluid from the support cylinder 28, the cylinders 42 and 44, and the arm cylinder 74.

It will thus be observed that positive motion is imparted to all of these parts to facilitate the use of the apparatus.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for cutting samples from bales comprising a support, a pair of horizontal, parallel arms projecting outwardly beyond said support and adapted to embrace a bale therebetween, means mounting said arms on said support for movement towards and from each other, a cutter for each arm having a pair of spaced knives, means supporting said cutters on adjacent surfaces of said arms for sliding movement longitudinally of said arms, means for causing sliding of said cutters whereby to make pairs of incisions on a bale from which may be taken samples from opposite sides of a bale clasped between said arms.

2. The combination of claim 1 wherein said arm mounting means includes a carriage having laterally extending members, means for adjusting said arms on said members laterally of said carriage.

3. The combination of claim 1 wherein said support comprises telescoping vertically slidable sections, means for causing controlled relative vertical sliding movement of said sections.

4. The combination of claim 1 wherein each arm includes a slide assembly mounted in said arm for longitudinally sliding movement, said cutter being mounted on said slide assembly.

5. The combination of claim 1 wherein each arm includes a slide assembly mounted in said arm for longitudinal sliding movement, said cutter mounted on said slide assembly, said slide assembly including upper and lower slide rods, a cutter, said cutter being mounted on one of said slides.

6. The combination of claim 5 wherein said cutter is polygonal in shape and has a plurality of peripheral cutting edges.

7. The combination of claim 5 wherein said cutter is polygonal in shape and has a plurality of peripheral cutting edges, a cover pivoted to said arm for enclosing said slide assembly.

8. The combination of claim 7 including a slot in said cover through which said cutter extends.

9. The combination of claim 1 wherein said mounting means includes a pair of laterally projecting members, each rigidly secured to an arm, cooperating guide means slidingly associated with said members.

10. The combination of claim 9 wherein said guide means includes laterally projecting solid and hollow guide bars and each member cooperating with those of the other member.

11. The combination of claim 10 wherein said hollow guide bars are fixedly secured to said carriage.

12. The combination of claim 11 wherein said adjusting means comprises an actuating element for each member for independent actuation of the same.

13. The combination of claim 12 wherein said actuating elements are secured to said carriage.

References Cited in the file of this patent

UNITED STATES PATENTS

| | | |
|---|---|---|
| 943,221 | Engberg | Dec. 14, 1909 |
| 1,057,468 | Vechinsky | Apr. 1, 1913 |
| 1,236,894 | Woods | Aug. 14, 1917 |
| 1,344,169 | Buckingham | June 22, 1920 |
| 1,555,391 | Surfus | Sept. 29, 1925 |
| 2,609,876 | Bauer et al. | Sept. 9, 1952 |
| 2,752,998 | Ferguson | July 3, 1956 |